United States Patent
Gregorius et al.

(10) Patent No.: US 7,088,976 B2
(45) Date of Patent: Aug. 8, 2006

(54) DEVICE FOR RECONSTRUCTING DATA FROM A RECEIVED DATA SIGNAL AND CORRESPONDING TRANSCEIVER

(75) Inventors: Peter Gregorius, Munich (DE); Torsten Hinz, Neuss (DE)

(73) Assignee: Infineon Technologies AG, Munich (DE)

( * ) Notice: Subject to any disclaimer, the term of this patent is extended or adjusted under 35 U.S.C. 154(b) by 85 days.

(21) Appl. No.: 10/492,390

(22) PCT Filed: Sep. 4, 2002

(86) PCT No.: PCT/EP02/09899

§ 371 (c)(1),
(2), (4) Date: Oct. 18, 2004

(87) PCT Pub. No.: WO03/034647

PCT Pub. Date: Apr. 24, 2003

(65) Prior Publication Data

US 2005/0063494 A1    Mar. 24, 2005

(30) Foreign Application Priority Data

Oct. 12, 2001    (DE) .................. 101 50 536

(51) Int. Cl.
H04B 1/06    (2006.01)
H04B 7/00    (2006.01)

(52) U.S. Cl. ................ 455/260; 455/343.1; 455/343.2; 375/327; 375/328

(58) Field of Classification Search ................ 455/260, 455/343.1, 343.2, 343.3, 343.5, 343.6; 375/327, 375/328

See application file for complete search history.

(56) References Cited

U.S. PATENT DOCUMENTS 5,530,389 A    6/1996 Rieder (Continued)

FOREIGN PATENT DOCUMENTS

DE    44 91 211 T1    2/1996

(Continued)

OTHER PUBLICATIONS

English Translation of Abstract for Japanese Publication No. 2001223683 A.

Primary Examiner—Quochien B. Vuong
Assistant Examiner—Tuan Pham
(74) Attorney, Agent, or Firm—Maginot, Moore & Beck

(57) ABSTRACT

In a transceiver which is configured in particular for transmitting optical data, there is provided a device for reconstructing data from a received data signal (RX), having a clock-signal recovery unit (3) for recovering a clock signal belonging to the transmitted data from the received data signal, and having a data reconstruction unit (2) for reconstructing the transmitted data from the received data signal using the recovered clock signal ($f_{CLK}$), and for emitting a data stream (DATA) which is synchronised with the recovered clock signal. A detector unit (9) detects an error state in the received data signal (RX) which prevents the data from being reconstructed reliably, switching means having a digital phase-locked lock (13) being provided to enable a signal having a clock rate which corresponds to the mean value of the clock signal ($f_{CLK}$) previously recovered by the clock-signal recovery unit (3) to be fed, as a reference signal, to a phase-locked loop of the clock-signal recovery unit (3) in this event in place of the received data signal, thus ensuring that the phase-locked loop of the clock-signal recovery unit (3) will continue to oscillate properly even in this event.

16 Claims, 1 Drawing Sheet

U.S. PATENT DOCUMENTS

| | | | |
|---|---|---|---|
| 5,613,235 A * | 3/1997 | Kivari et al. | 455/574 |
| 2002/0033714 A1* | 3/2002 | Perrott | 327/12 |
| 2005/0030073 A1* | 2/2005 | Wakayama et al. | 327/156 |

FOREIGN PATENT DOCUMENTS

| | | |
|---|---|---|
| EP | 1 006 662 A2 | 6/2000 |
| EP | 1 104 113 A2 | 5/2001 |
| WO | WO 94/21048 | 9/1994 |
| WO | WO 97/20393 | 6/1997 |
| WO | WO 01/15324 A1 | 3/2001 |
| WO | WO 01/31792 A2 | 5/2001 |

* cited by examiner

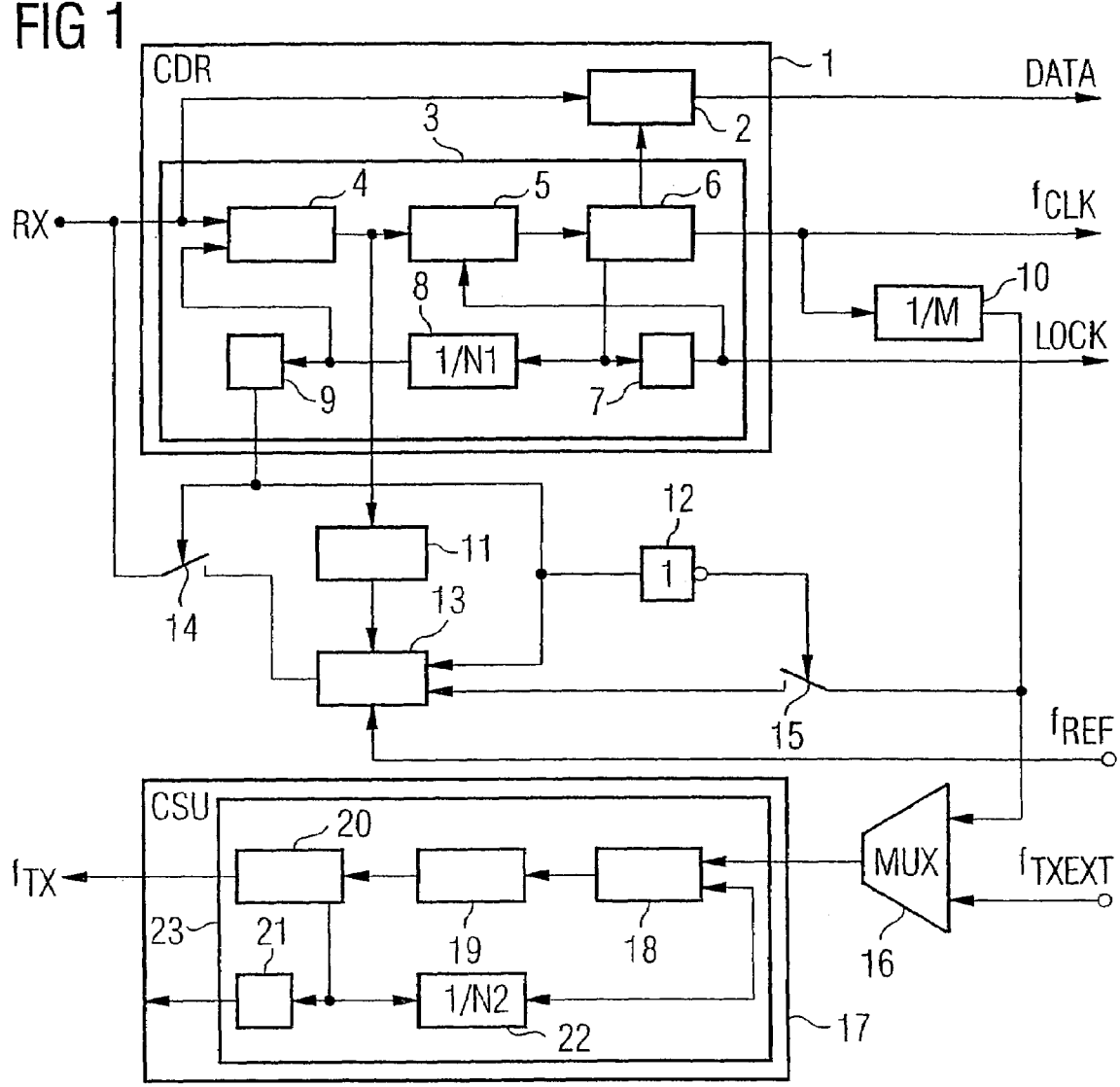
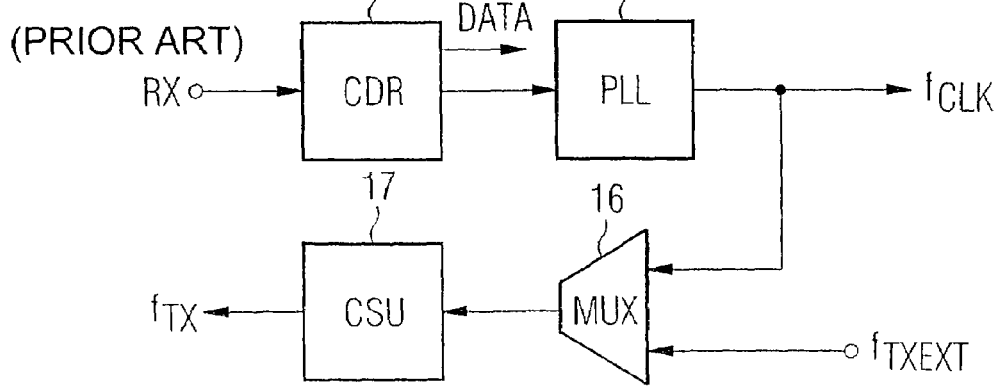

DEVICE FOR RECONSTRUCTING DATA FROM A RECEIVED DATA SIGNAL AND CORRESPONDING TRANSCEIVER

FIELD OF THE INVENTION

The present invention relates to a device for reconstructing data from a received data signal to enable the data in the data signal, particularly in the form of unscrambled data, which data is transmitted over a transmission link, to be reconstructed. In addition to this, the present invention also relates to a transceiver in whose receiving unit a reconstruction device of this kind is used.

BACKGROUND

In digital hard-wired transmission systems, digital data in the form of square-wave or trapezoidal pulses is fed into a transmission cable, usually a copper cable or a fibre-optic cable, and is received by a receiver at the other end of the cable. When this is done, the data signal becomes attenuated in respect of amplitude and distorted in respect of phase angle and group transit time as a result of being transmitted, in which case it may also have high-frequency and low-frequency interference superimposed on it. The distorted incoming signal at the receiver must therefore be amplified and freed of distortion in the receiver before any reconstruction or recovery is possible of the data which was transmitted in the form of the data signal. For this purpose, known receivers comprise an amplifier at the input end, a distortion remover (equalizer) connected downstream of the amplifier, a clock-signal recovery unit for regenerating or recovering the clock signal belonging to the data transmitted and a data reconstruction unit for reconstructing the data originally transmitted, a data stream synchronised with the regenerated or recovered clock signal being produced by the data reconstruction unit. The clock-signal recovery and data reconstruction units dealt with above are usually combined into a circuit which is referred to as a clock and data recovery (CDR) unit.

What has predominantly been used to date for clock-signal recovery and data reconstruction has been a CDR unit produced in mixed-signal circuit technology which thus has both analog and digital circuit components, it being the analog data signal which has previously been equalized or filtered which is fed to this CDR unit. In the CDR unit, this data signal is assessed for its phase, for example, by an analog phase detector based on switched-capacitor circuit technology, to enable the clock signal of the transmitted data to be derived therefrom with the help of a suitable phase-locked loop. This principle is based on over-sampling of the received data signal and thus results in stringent demands being made on the analog circuitry. What is more, the entire data signal is needed for assessment on this principle, and the amplitude of the data signal also has to be stable.

In CDR circuits of purely digital design, the received data signal is first digitised with the help of a comparator, with the CDR circuit which follows the comparator assessing only the edges of the digitised data signal, to enable the clock signal of the transmitted data to be regenerated with the help of a digital phase-locked loop. However, CDR circuits of purely digital design often cause relatively extreme abrupt phase shifts within the CDR circuit, as a result of which the jitter requirements laid down by the particular data transmission standard may, under certain circumstances, not be satisfied.

A further approach to a solution is shown diagrammatically in FIG. 2.

What is shown in this case is a CDR circuit 1 of digital design for recovering a clock signal and regenerating data from a received data signal RX. The digital CDR unit 1 regenerates the clock signal of the data originally transmitted using a digital phase-locked loop to which the digitised data signal RX is fed as a reference signal, thus enabling the data originally transmitted DATA to be reconstructed from the received data signal RX by using the clock signal which has been regenerated in this way.

Provided in transceivers is not only a receiving section having a CDR unit of the kind described above but also a transmitting section for transmitting data at a given clock frequency. Associated with this transmitting section is a unit 17 referred to as a clock synthesizer unit which derives the transmission clock signal $f_{TX}$ for the transmission of data as a function of the clock signal regenerated by the CDR unit 1. In a similar way to the CDR unit, this CSU unit generally comprises a phase-locked loop to which the clock signal recovered by the CDR unit 1, or a clock signal $f_{CLK}$ derived therefrom, is fed as a reference clock signal. Due to the demanding requirements which the CSU unit 17 is called upon to meet in respect of intrinsic jitter, there is provided in the known solution shown in FIG. 2 a further phase-locked loop (PLL) 3 to attenuate jitter, which loop conditions the clock signal recovered by the CDR unit 1 and frees it of jitter before the de-jittered clock signal $f_{CLK}$ is fed to the CSU unit 17 for generating the transmission clock signal $f_{TX}$. The phase-locked loop 3 may be designed using mixed-signal circuit technology.

In the example shown in FIG. 2, there is also a multiplexer 16 provided by means of which an external reference clock signal $f_{TXEXT}$ can be selected as a reference clock signal for the CSU unit 17 in place of the clock signal $f_{CLK}$ emitted by the phase-locked loop 3. The external clock signal $f_{TXEXT}$ may, for example, be a clock signal which, although it originates from the clock signal recovered by the CDR unit 1, has been produced externally.

The disadvantage of the solution shown in FIG. 2 lies in the fact that a total of three phase-locked loops are required, which means that implementation is relatively costly and complicated and the area and power required are relatively large. Also, the sensitivity of the circuit shown in FIG. 2 to noise and internal and external sources of interference is relatively great due to the lack of insulation between the individual phase-locked loops.

The demands made on the clock-signal recovery and data reconstruction that arise from the data transmission standard which is implemented in the given case are generally high. In this way, the clock-signal recovery has to proceed reliably even with data strings in which there are long sequences of zeroes or in which there is no change of edge for a long period (so-called NRZ (non-return-to-zero) data). The jitter tolerance and bit error rate (BER) laid down by the particular data transmission standard have to be observed. With regard to the clock-signal generation carried out by the CSU unit, stringent requirements have to be met in respect of jitter suppression or low intrinsic jitter. Generally speaking, the clock-signal recovery and data reconstruction should work for both scrambled data and unscrambled data.

Particularly demanding requirements have to be met by the stability of the clock signal or frequency in the event of the received data signal, i.e. the incoming data stream, not being present at all or not being of a sufficiently high level or there not being a sufficiently large number of transmissions (the so-called "loss-of-signal" state), which means that reliable recovery of the clock signal or reconstruction of the data by analysing the received data signal is prevented in the CDR unit. What in particular has to be ensured in this case is that the phase-locked loop contained in the CDR unit continues to run even if this loss-of-signal error state occurs.

SUMMARY

The object underlying the present invention is therefore to provide a device for reconstructing data from a received data signal by means of which the requirements explained above can be met in the easiest possible way and in particular it is ensured that the phase-locked loop contained in the CDR or clock-signal and data reconstruction unit will continue running even if the loss-of-signal state occurs.

In accordance with the invention, the loss-of-signal error state, in which reliable reconstruction of the data by analysing the received data signal is prevented, is detected, there being provided switching means which in this event feed to the phase-locked loop of the data reconstruction unit, as its reference signal, a clock signal which corresponded over a certain number of previous data transmissions to the mean recovered clock signal from the clock-signal recovery unit. The clock-signal recovery unit and data reconstruction unit may be contained in a CDR circuit which is constructed using mixed-signal circuitry technology, in which case the clock-signal recovery unit may contain an analog voltage or current-controlled oscillator (VCO or CCO) having a digital frequency divider in the feedback path of the particular phase-locked loop, a digital phase detector, an analog charge pump and a loop filter having an integral and a proportional section. What may be used as a detector unit for detecting the loss-of-signal error state is, for example, a frequency comparator which has an integrated loss-of-signal detecting means and is connected to the phase-locked loop.

What may be used as switching means which ensure that, in the event of the loss-of-signal error state being detected, a certain average clock frequency is fed (temporarily) to the phase-locked loop of the CDR unit as a reference frequency, thus enabling the phase-locked loop to continue running as if there were a data stream present, are a simple digital phase-locked loop with a pure integral-action controller characteristic, thus enabling a switch-over to be made in this way to a reference signal for the phase-locked loop of the CDR unit whose frequency and phase are stable. Because of the purely integral section of this digital phase-locked loop, the time constant of the frequency drift is relatively high or can be arranged to be programmable. Due to the presence of a digital oscillator operated by a high-frequency basic clock signal, an integral-action controller characteristic having a relatively low corner frequency can be obtained.

To avoid abrupt phase shifts when this reference signal is switched to on detection of the loss-of-signal error state, compensating means may be provided which correct delays or abrupt phase shifts of this kind, or in other words which manipulate the phase for the digital phase-locked loop in such a way that an abrupt phase shift of this kind does not occur in the reference signal for the phase-locked loop of the CDR unit which is generated by the phase-locked loop.

When the present invention is used in a transceiver, a frequency divider may be provided at the output of the CDR unit to generate various clock signals which can be fed to the phase-locked loop of the CSU unit as a reference signal. The CSU unit which is associated with the transmitting section of the transceiver generates the transmission frequency for the transmission of data as a function of this reference signal, or rather as a function of this reference frequency.

The CSU unit, and the phase-locked loop implemented therein, are designed to meet demanding requirements for intrinsic jitter. The phase-locked loop of the CSU unit may in particular be designed using mixed-signal circuit technology.

The present invention is preferably suited to the reconstruction of data which is transmitted over an optical transmission line, under the SONET transmission standard, for example. However, the present invention is not of course limited to this preferred field of application of optical data transmission and can in principle be used for the reconstruction of data transmitted over a transmission link of any desired design.

With the help of the present invention, the analog components required for the reconstruction of data can be reduced, thus making possible a high degree of independence of production tolerances and making the invention easy to transfer to other technologies. Only two phase-locked loops designed using (mixed-signal circuit technology) and having analog oscillators are required, thus enabling a better jitter performance to be achieved. Because of the use of the digital phase-locked loop and of a pure integral-action controller characteristic, the stability of frequency which is called for can be guaranteed on detection of the loss-of-signal error state. The device proposed in accordance with the invention for clock-signal recovery and data reconstruction has signal processing facilities which, to a large degree, can be set to parameters, or in other words has programmable properties, thus enabling the device according to the invention to be adapted easily to different data transmission standards.

Because of the use of only two phase-locked loops for, respectively, clock-signal recovery (in the CDR unit) and clock-signal generation (in the CSU unit), power consumption can be reduced. What is more, in contrast to the prior art described at the beginning, the approach employing two phase-locked loops respectively for clock-signal recovery and clock-signal generation is more robust.

On detection of the loss-of-signal error state, a high time constant is, as has already been mentioned, produced by the phase-locked loop of purely digital construction having the pure integral-action section, and the stringent requirements for stability on the part of the frequency of the clock signal generated or recovered by the CDR unit are thus met, in which case, in contrast to analog approaches, no external components or analog circuits of high power consumption are required to obtain such a time constant. What is more, to allow sudden phase shifts on detection of the loss-of-signal error state to be avoided, the phase detector contained in the phase-locked loop of the CDR unit is examined to enable a phase having the least difference from the original data stream then to be selected. This is possible because the clock signal in the integral-action controller of the digital phase-locked loop bears a fixed phase relationship to the clock signal which was previously recovered and made available by the CDR unit.

BRIEF DESCRIPTION OF THE DRAWINGS

The present invention will be explained in detail below by reference to a preferred embodiment and to the accompanying drawings.

FIG. 1 is a simplified block circuit diagram to allow the present invention to be explained by reference to a preferred embodiment, and FIG. 2 shows a known clock-signal recovery and data reconstruction device in combination with a unit for clock-signal regeneration in a prior-art transceiver component.

DETAILED DESCRIPTION

In FIG. 1 is shown a circuit for recovering a clock-signal and reconstructing data from a data signal RX which is transmitted over a transmission link, such as an optical transmission line for example (which circuit will be referred to below, for the sake of simplicity, as a CDR unit). The CDR unit 1 comprises a clock-signal recovery unit 3 for regenerating the clock signal of the transmitted data from the received data signal RX and a data reconstruction unit 2, to enable the data originally transmitted to be reconstructed from the received data stream as a function of the clock signal which has been recovered in this way, and to enable a data stream DATA which is synchronised with the recovered clock signal to be emitted. The CDR (clock and data recovery) unit 1 is designed using so-called "mixed-signal" circuit technology.

The clock-signal recovery unit 3 comprises a phase-locked loop having a digital phase detector 4 and having an analog circuit unit connected downstream of the phase detector 4, which unit has a charge pump and a circuit filter having an integral and a proportional section, and comprises an analog current-controlled oscillator 6, and a frequency divider 8 whose division ratio is 1/N1 and which is arranged in the feedback path of the phase-locked loop. The digital phase detector 4 compares the clock frequency of the received data signal RX which is fed to it with the clock frequency from the digital frequency divider 8 and generates, as a function of the result of the comparison, a setting signal for the current-controlled oscillator 6 to set the frequency of oscillation of the latter accordingly. A voltage-controlled oscillator 6 may of course equally well be used but current-controlled oscillators are more advantageous at low signal levels. When the phase-locked loop is in the locked-on or settled state, the clock frequency $f_{CLK}$ generated by the current-controlled oscillator 6 corresponds to the clock signal of the data transmitted by the data signal RX, thus enabling the data reconstruction unit 2 to reconstruct the data originally transmitted from the data signal RX as a function of this clock frequency $f_{CLK}$ and to emit a data stream DATA which is synchronised with the clock signal $f_{CLK}$.

Coupled to the phase-locked loop described above of the clock-signal recovery unit 3 is a detector unit 7 which, by analysing the output signal from the current-controlled oscillator 6, establishes whether the phase-locked loop is in a settled or locked-on state and drives the unit 5 having the charge pump and the loop filter accordingly as a function of this. In addition to this, the detector unit 7 generates a signal LOCK which provides related information on the current state of the phase-locked loop (PLL).

As well as this, there is provided a frequency comparator 9 having integrated loss-of-signal detection means which analyses the output signal from the digital frequency divider 8 of the phase-locked loop and is thus able to detect an excessively large difference in frequency which occurs in the loss-of-signal error state. As has already been explained above, a condition may occur where the incoming data stream RX may not be present at all or may not be of an adequate level or there may be only an insufficient number of data transmissions, which means that, all in all, the loss-of-signal error state described above arises which prevents the clock signal from being recovered, and data from being reconstructed, reliably. A particular result of this loss-of-signal error state is that the phase of the clock signal generated by the phase-locked loop of the clock-signal recovery unit 3 wanders.

For this reason, there are provided switching means 11–15 which, when the loss-of-signal error state is detected, switch over to operation in what is referred to as a "hold-over" mode and ensure that a clock signal whose frequency corresponds to the clock frequency which was generated last by the clock-signal recovery unit 3 over a given number of data transmissions is fed to the phase detector 4 of the clock-signal recovery unit 3 as a reference clock signal. This reference signal which is fed to the phase detector 4 by the switching means 11–15 thus replaces the data signal RX (which is not present in the loss-of-signal state).

The averaging of frequency described above is performed by a digital phase-locked loop 13 having a very low corner frequency and a pure integral-action controller characteristic. An external reference frequency $f_{REF}$ is fed to the digital phase-locked loop 13. The output of the digital phase-locked loop 13 is connected via a controllable switch 14 to the input of the phase detector 4 of the clock-signal recovery unit 3. Conversely, the input of the digital phase-locked loop 13 is coupled via another controllable switch 15 to the output of the phase-locked loop of the clock-signal recovery unit 3. In the embodiment shown, there is provided between the output of the phase-locked loop of the clock-signal recovery unit 3 and the controllable switch 15 a frequency divider 10 having a division ratio 1/M which divides down the clock frequency $f_{CLK}$ generated by the current-controlled oscillator 6. The frequency divider 10 will be dealt with later.

In normal operation, the controllable switch 14 is open and the controllable switch 15 closed, so that what is fed to the digital phase-locked loop 13, or rather to the integral-action controller implemented therein, as a reference frequency is the clock frequency $f_{CLK}$ from the clock-signal recovery unit 3 which has been divided down by the frequency divider 10. If on the other hand the loss-of-signal state is detected, the controllable switch 15 is opened and the controllable switch 14 closed, so that the digital phase-locked loop 13 can continue to oscillate at the last, average (divided-down) clock frequency from the phase-locked loop of the clock-signal recovery unit 3, the output frequency from the digital phase-locked loop 13 being fed to the phase detector 4 of the clock-signal recovery unit 3 as a new reference frequency. The controllable switches 14 and 15 are thus actuated alternately by the frequency comparator 9, which is achieved by having the output of the frequency comparator 9 actuate the controllable switch 15 via an inverter 12.

When the loss-of-signal error state is detected and there is a switch-over to the hold-over mode explained above, what generally occurs is an abrupt phase shift of 1 bit because it is not possible to switch over directly. It is true that an abrupt phase shift of this kind is permissible under the transmission standards which apply at the moment, but it is, nevertheless, advantageous if phase is manipulated for the integral-action controller implemented in the digital phase-locked loop 13 in such a way that the abrupt phase shift is compensated for, meaning that an abrupt phase shift of this kind does not in fact occur at the output of the digital phase-locked loop 13 at the switch-over to the hold-over mode. In the embodiment shown in FIG. 1, this is achieved by means of a compensator unit 11 which analyses the phase at the output of the phase detector 4 of the phase-locked loop of the clock-signal recovery unit 3 for this purpose so that, at the switch-over to the hold-over mode, the delay which occurs at this time can be allowed for and a phase with the least difference from that of the original data stream can be selected accordingly.

The circuit as a whole which is shown in FIG. 1 is a circuit such as is used in transmitting and receiving arrangements, i.e. in transceiver components. The circuit shown in FIG. 1 therefore comprises not only the CDR unit 1 which is provided for clock-signal recovery and data reconstruction but also a circuit 17 for generating, as a function of the clock signal $f_{CLK}$ recovered by the CDR unit 1, a transmission clock-signal $f_{TX}$ for the transmission of data (which circuit will, for the sake of simplicity, be referred to below as a CSU unit). In a similar way to the CDR unit 1, the CSU (clock synthesizer unit) unit 17 has for this purpose a phase-locked loop 23 which is designed using mixed-signal circuit technology and which comprises a digital phase detector 18, an analog unit 19 having a charge pump and having a loop filter having integral and proportional sections, an analog current-controlled oscillator 20, and, in the feedback path, a digital frequency divider 22 having a division ratio 1/N2. When this phase-locked loop 13 is in the settled or locked-on state, the current-controlled oscillator 20 generates a transmission clock signal $f_{TX}$ which corresponds to the reference clock signal fed to the digital phase detector 18.

Particularly under the SONET transmission standard, the transmission frequency is relatively high, but the data is not processed at this high frequency. The low-frequency reference clock signal generated by the frequency divider 10 is therefore stepped up to the desired transmission clock rate $f_{TX}$ by the CSU unit 17 which is associated with the transmission section of the transceiver component.

Also provided in FIG. 1 is the multiplexer 16 which was explained above with reference to FIG. 2, which means that, for the function of this multiplexer 16, reference may be made to what was said in connection with FIG. 2.

The invention claimed is:

1. A device for reconstructing data from a received data signal comprising:
    a clock-signal recovery unit configured to generate a clock signal from the received data signal, the clock-signal recovery unit including a phase-locked loop to which the received data signal is fed as a reference signal and which produces the recovered clock signal in a phased-in state and a detector unit configured to detect an error state in the received data signal which prevents the data from being reliably reconstructed therefrom;
    a data reconstruction unit configured to reconstruct the data from the received data signal using the recovered clock signal;
    a switching network including a digital phase-locked loop, the switching network being coupled to the clock-signal recovery unit and configured, when the error state is detected, to provide to the phase-locked loop of the clock-signal recovery unit as its reference signal a signal having a clock rate that corresponds to a mean clock signal from the clock-signal recovery unit which was recovered over a given number of previous data transmissions; and
    wherein the digital phase-locked loop is provided a signal derived from the recovered clock signal from the clock-signal recovery unit as a reference signal.

2. The device of claim 1, wherein the detector unit is operably coupled to the phase-locked loop of the clock-signal recovery unit.

3. The device of claim 2, wherein the detector unit includes a frequency comparator having an integrated error-state detecting means.

4. The device of claim 1, wherein the phase-locked loop of the clock signal recovery unit includes a frequency divider and the detector unit configured to detect the error state analyzes an output signal from the frequency divider.

5. The device of claim 1, wherein the digital phase-locked loop exhibits a pure integral-action controller characteristic.

6. The device of claim 1, wherein the switching network includes a first and a second controllable switch controllably coupled to the detector unit and wherein an output of the digital phase-locked loop is connected to an input of the phase-locked loop of the clock-signal recovery unit via the first controllable switch and an input of the digital phase-locked loop is connected to an output of the phase-locked loop of the clock-signal recovery unit via the second controllable switch, the first controllable switch being opened and the second controllable switch being closed by the detector unit in a normal state, and the first controllable switch being closed and the second controllable switch being opened by the detector unit when the error state is detected.

7. The device of claim 1, wherein the switching network comprises a compensator configured to compensate for abrupt phase shifts upon detection of the error state at a change to the signal of the mean recovered clock rate as a reference signal for the phase-locked loop of the clock-signal recovery unit.

8. The device of claim 7, wherein the phase-locked loop of the clock-signal recovery unit includes a phase detector and the compensator analyzes an output signal of the phase detector to allow compensation for abrupt phase shifts.

9. The device of claim 1, wherein the phase-locked loop of the clock-signal recovery unit comprises a digital phase detector, an analog oscillator which is controlled via an output of the digital phase detector and a digital frequency divider arranged in a feedback bath of the phase-locked loop.

10. The device of claim 9, wherein the phase-locked loop of the clock-signal recovery unit further comprises an analog unit having a charge pump and a loop filter having an integral and proportional section, arranged between the digital phase detector and the analog oscillator.

11. The device of claim 9, wherein the analog oscillator in the phase-locked loop of the clock-signal recovery unit comprises a current-controlled oscillator.

12. A transceiver for transmitting and receiving data signal over a transmission link, the transceiver comprising:
    a receiving unit including a device for the reconstruction of data from a received data signal comprising;
        a clock-signal recovery unit configured to recover a clock signal from the received data signal, the clock-signal recovery unit including a phase-locked loop to which the received data signal is fed as a reference signal and which produces the recovered clock signal in the phased-in state and a detector unit configured to detect an error state in the received data signal which prevents the data from being reliably reconstructed therefrom;
        a data reconstruction unit configured to reconstruct the data from the received data signal using the recovered clock signal;
        a switching network including a digital phase-locked loop, the switching network being coupled to the clock-signal recovery unit and configured, when the error state is detected, to provide to the phase-locked loop of the clock-signal recovery unit as its reference signal a signal having a clock rate that corresponds to a mean clock signal from the clock-signal recovery unit which was recovered over a given number of previous data transmissions, and wherein the digital phase-locked loop is fed a signal derived from the recovered clock signal from the clock-signal recovery unit as a reference signal; and a transmitting unit including a clock-signal generating unit configured to generate, as a function of the clock signal recovered by the clock-signal recovery unit, a transmission clock signal for a data signal to be transmitted.

13. The transceiver of claim 12, wherein the clock signal recovered by the clock-signal recovery unit is provided via a frequency divider to the clock-signal generating unit as a reference signal.

14. The transceiver of claim 13, wherein the switching network includes a first and a second controllable switch controllably coupled to the detector unit and wherein an output of the digital phase-locked loop is connected to an input of the phase-locked loop of the clock-signal recovery unit via the first controllable switch and an input of the digital phase-locked loop is connected to an output of the phase-locked loop of the clock-signal recovery unit via the second controllable switch, the first controllable switch being opened and the second controllable switch being closed by the detector unit in a normal state, and the first controllable switch being closed and the second controllable switch being opened by the detector unit when the error state is detected.

15. The transceiver of claim 13 wherein the phase-locked loop of the clock-signal recovery unit comprises a digital phase detector, an analog oscillator which is controlled via an output of the digital phase detector and a digital frequency divider arranged in a feedback bath of the phase-locked loop.

16. The transceiver of claim 12, wherein the transceiver is equipped for the transmission of optical data.

* * * * *